No. 702,383. Patented June 10, 1902.
W. G. TYSON.
STOP VALVE.
(Application filed Aug. 7, 1901.)
(No Model.)
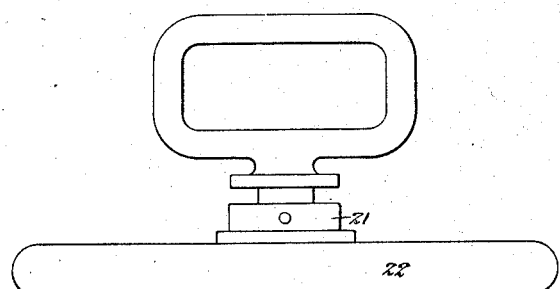
Fig. 1.
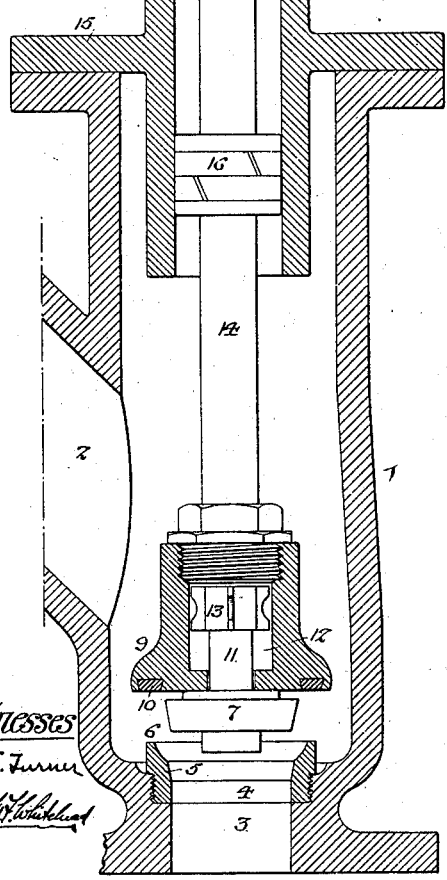
Fig. 2.
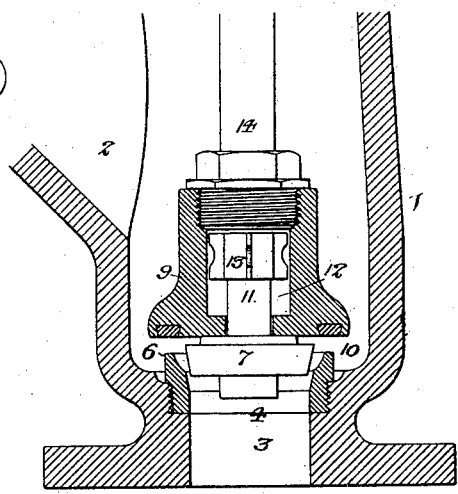
Fig. 3.
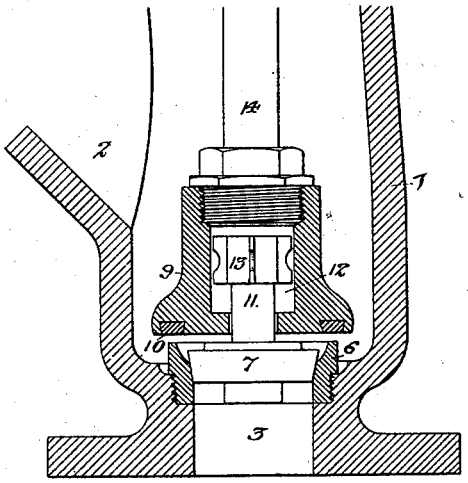
Witnesses
Inventor:—
William G. Tyson
by his Attorneys:—
Howson & Howson

UNITED STATES PATENT OFFICE.

WILLIAM G. TYSON, OF PHILADELPHIA, PENNSYLVANIA, ASSIGNOR OF ONE-HALF TO FRANK TYSON, OF PHILADELPHIA, PENNSYLVANIA.

STOP-VALVE.

SPECIFICATION forming part of Letters Patent No. 702,383, dated June 10, 1902.

Application filed August 7, 1901. Serial No. 71,261. (No model.)

*To all whom it may concern:*

Be it known that I, WILLIAM G. TYSON, a citizen of the United States, residing in Philadelphia, Pennsylvania, have invented certain Improvements in Stop-Valves, of which the following is a specification.

The object of my invention is to so combine a check-valve with a stop-valve that the check-valve will close before the stop-valve reaches its seat, thereby cutting off the flow of fluid between the stop-valve and its seat, so as to relieve the valve from pressure and permit it to close easily and without shock or jar, the quick action of the check-valve in closing effectually overcoming the objections which arise from the closing of the passage upon a rapidly-moving current.

In the accompanying drawings, Figure 1 is a vertical section of a stop-valve constructed in accordance with my invention; and Figs. 2 and 3 are similar sections of a portion of the structure, showing the parts of the valve in different relations.

The casing of the valve is represented at 1, said casing having an inlet branch 2 at one side and an outlet 3 at the bottom. Surrounding this outlet is a ring 4, on which are formed seats 5 and 6 for two valves 7 and 9, the valve 7 being a tapered check-valve and the seat 5 being correspondingly tapered, while the valve 9 is a stop-valve and has a packing ring or washer 10 for bearing upon the seat 6. The valve 7 has a stem 11 projecting upwardly into a chamber 12 in the valve 9 and provided at its upper end with a head 13, guided in said chamber, the vertical dimensions of the chamber and head being such that the valve 7 is permitted to have a limited amount of vertical play independently of the valve 9. The stem 14 of the valve 9 passes through the bore of a cap 15, mounted on the casing 1, and has suitable packing 16 within said bore for preventing the escape of fluid upwardly therefrom, and the cap 15 has at the top a nut 17, to which is adapted a screw-plug 19, confined vertically between collars 20 and 21 on the stem 14 and provided with a hand-wheel 22, whereby it may be readily turned in one direction or the other, so as to force the valve 9 down upon the seat 6 or raise it therefrom.

In the operation of the valve the check-valve member 7 of the same is held up against the under side of the stop-valve member 9 by the pressure of the fluid underneath the same until the check-valve member has reached a point where the rapid downflow of fluid around the same exercises a downward-impelling influence in excess of the upward pressure upon the check-valve, so as to draw it down into its seat, the flow of fluid being thereby suddenly cut off, so as to prevent the "wire drawing" of the fluid through a gradually-decreasing passage as the valve 9 is moved down onto its seat, such movement taking place through a body of fluid in a state of rest, and hence being effected without shock or jar. In opening the valve, the operating movements being reversed, the stop-valve member 9 is raised from its seat to the extent of the vertical play of the check-valve member 7 independently of the main-valve member 9 before said check-valve member is started from its seat. Hence the passage of fluid between the main valve and its seat will not be attended by friction which will be injurious to either valve or seat and the main valve will consequently be subjected to but little wear and can be kept perfectly tight.

Having thus described my invention, I claim and desire to secure by Letters Patent—

1. The combination of a stop-valve located in the inlet-chamber of the valve-chest and having a check-valve projecting therefrom and capable of limited longitudinal movement independently thereof, with a valve-chest having two seats, one for the stop-valve and another, beyond the same, in the direction of the outlet from the chest for the check-valve, substantially as specified.

2. The combination of a stop-valve having a chamber therein, a check-valve projecting from said stop-valve and having a stem with enlarged head contained within the chamber of said stop-valve and having longitudinal play therein, and a valve-casing having a seat for the stop-valve, and, beyond the same, a seat for the check-valve, substantially as specified.

In testimony whereof I have signed my name to this specification in the presence of two subscribing witnesses.

WILLIAM G. TYSON.

Witnesses:
WILL. A. BARR,
JOS. H. KLEIN.